United States Patent [19]
Lake

[11] Patent Number: 5,416,529
[45] Date of Patent: May 16, 1995

[54] METHOD AND SYSTEM FOR DIGITAL VIDEO PROCESSING WITH COMBINED DOWNSTREAM KEYER AND FADE TO BLACK MIXER

[75] Inventor: David E. Lake, Grass Valley, Calif.

[73] Assignee: ImMIX, Grass Valley, Calif.

[21] Appl. No.: 182,284

[22] Filed: Jan. 14, 1994

[51] Int. Cl.$^6$ .............................................. H04N 9/74
[52] U.S. Cl. ...................... 348/590; 348/591; 348/595; 348/586
[58] Field of Search ............... 348/584, 585, 586, 590, 348/591, 595, 589, 597, 600, 239; 358/22, 22 CK, 22 PIP, 22 C; H04N 9/74, 9/75, 9/76, 5/262

[56] References Cited

U.S. PATENT DOCUMENTS

| | | | |
|---|---|---|---|
| 4,851,912 | 7/1989 | Jackson | 348/586 |
| 4,970,595 | 11/1990 | Bloomfield | 348/584 |
| 5,313,566 | 5/1994 | Hedley | 348/584 |

*Primary Examiner*—James J. Groody
*Assistant Examiner*—Sherrie Hsia
*Attorney, Agent, or Firm*—Limbach & Limbach

[57] ABSTRACT

A method and system for combining digital data signals representing digitized images to implement a DSK operation in one mixing stage. The system requires only one mixing circuit, rather than two as in conventional DSK systems. In preferred embodiments, the DSK operation processes an input video signal having pixels $a_k$, an input video signal having pixels $b_k$, a stream of single-color pixels B, and a fade control signal $\beta$, to generate a stream of output pixels $u_k = (1-\beta)v_k + \beta B$, where $v_k = (1-\alpha)a_k + (\alpha)b_k$, and $\alpha$ is a key signal which can have a different value for each pixel $a_k$. The value of $\alpha$ can be constant for an entire frame of input pixels $a_k$ or can have a different value for each individual pixel $a_k$. Typically, the value of $\beta$ is constant for each frame of input pixels $a_k$. Preferred embodiments of the system employ a single mixing circuit, which receives five input data streams: first pixels $a_k$, second pixels $b_k$, a third stream of scaled pixels $\beta B$, first key signal $c_v = (1-\beta) - \alpha(1-\beta)$, and second key signal $c_g = \alpha(1-\beta)$. Preferably, the system includes a look-up table which outputs one value of the second key signal $c_g$ in response to each input pixel $b_k$, or in response to each pixel of an external key video signal, and the system includes simple circuitry for processing each value of the second key signal $c_g$ to generate a corresponding value of the first key signal $c_v$.

28 Claims, 2 Drawing Sheets

METHOD AND SYSTEM FOR DIGITAL VIDEO PROCESSING WITH COMBINED DOWNSTREAM KEYER AND FADE TO BLACK MIXER

FIELD OF THE INVENTION

The invention relates to methods and systems for mixing or combining digital video signals. More specifically, the invention is a method and system for combined performance of both a keying stage and a fade to black mixing stage of a downstream keying (DSK) operation.

BACKGROUND OF THE INVENTION

Throughout the specification (including in the claims) the terms "video data" and "video signal" are used to denote any of the broad class of image signals indicative of pixels of an image, including analog image signals and digital image signals. In conventional video signal processing, an operation known as downstream keying (DSK) is often performed. The term "downstream" refers to the fact that this operation is usually the last in a sequence of video processing operations before final distribution of a processed video signal (e.g., broadcast transmission or distribution in the form of a master video tape). A DSK operation conventionally includes two stages: first, a video mixing operation of the type known as a "key" or "keying" operation, in which pixels of a first video signal are selectively combined with or replaced by pixels of another video signal (typically, titles are overlayed over frames of the first video signal); and second, a "fade to black" mixing operation in which the output signal from the first stage is mixed in a controlled manner with a black video signal.

FIG. 1 is a diagram of conventional digital circuitry for implementing the two stages of a conventional DSK operation. Mixer circuit 5 of FIG. 1 performs a video mixing (keying) operation (the first stage of the DSK operation) to generate a stream of output pixels having values $v_k = (1-\beta)a_k + (\alpha)b_k$, in response to three input data streams: a stream of input pixels $a_k$ (of a first video signal V), a stream of input pixels $b_k$ (of a second video signal C), and a stream of key values $\alpha$ (a key signal). Each key value $\alpha$ of the key signal has a value in the range from 0 to 1.0.

When $\alpha = 0$, the first video signal is passed through circuit 5 to "fade to black" mixing circuit 11. As $\alpha$ increases toward the value 1.0, the pixels of the output of circuit 5 represent a proportionally increasing amount of the first video signal and a proportionally decreasing amount of the second video signal. At the upper limit, $\alpha = 1.0$, the second video signal is passed through circuit 5 to circuit 11. A static value for $\alpha$ causes the output of circuit 5 (when displayed) to appear as a blend of the first and second video signals. $\alpha$ can be stepped in value (between each video field) to achieve a crossfade from the first to the second video signal. The fade rate is controlled by the amount by which $\alpha$ is stepped between each video field.

There is no restriction on the dynamic behavior of $\alpha$. The value of $\alpha$ may be changed at a very high frequency (pixel rate) to selectively blend the two input video pixel streams, thereby achieving patterned selection and blending of the two input images over the output video raster.

The FIG. 1 circuit can derive $\alpha$ from the second input video signal (for example, when the latter signal determines insert pictures or titles to replace portions of each frame of the first video signal). In this case, key selector switch 1 is controlled (for example, in response to a control signal from processor 3) to pass through the second input video signal (labeled "insert picture" in FIG. 1) to key processor 3, so that processor 3 can derive $\alpha$ therefrom. In this case, $\alpha$ is known as a "self key" signal.

Alternatively, $\alpha$ can be derived from another video signal (e.g., from the signal denoted "external key video" in FIG. 1). In this case, key selector switch 1 is controlled to pass through the external key video signal to key processor 3, so that processor 3 can derive $\alpha$ therefrom. In this case, $\alpha$ is known as an "external key" or "alpha key" signal.

"Fade to black" mixing circuit 11 of FIG. 1 performs a video mixing operation (the second stage of the DSK operation) to generate a stream of output pixels $u_k = (1-\beta)v_k + \beta B$, in response to three input data streams: a stream of pixels $v_k$ (the output of circuit 5), a stream of pixels B (of a "black" video signal or other single-color video signal), and a stream of values $\beta$. Each value $\beta$ is in the range from 0 to 1.0.

Processor 2 controls the transfer of pixels B from storage circuit 7 to one input terminal of circuit 11. Processor 2 also controls the writing of values $\beta$ into register 9, and the transfer of values $\beta$ from register 9 to a second input terminal of circuit 11. A third input terminal of circuit 11 receives pixels $v_k$ from circuit 5.

In typical cases in which $\beta$ has a constant value for each frame of pixels $v_k$, the output of circuit 11 is a video signal which, when displayed, will be a static mixture of a black (or other solid color) image determined by pixels B, and an image determined by a frame of pixels $v_k$. As $\beta$ is stepped in value with each frame of pixels $v_k$, the proportion of the mixture of black (or other color), and the image determined by the current frame of pixels $v_k$, changes.

In typical operation of FIG. 1, the first video signal (denoted "background picture" in FIG. 1) consists of frames of pixel data, each frame determining a picture on which the key is to be superimposed. The second video signal (denoted "insert picture" in FIG. 1) consists of pixels determining the fill pattern of the key. In the case that a title is to be superimposed on the background picture, the pixels of the insert picture represent a solid color or pattern (or areas of color or pattern) with which the title will appear to be "painted."

Sometimes the insert picture consists of frames of pixel data. If each of such frames were displayed, it would appear as a title surrounded by a field of black pixels. The key ($\alpha$) can readily be determined from such an insert picture.

As mentioned above, if the key ($\alpha$) is not determined from the insert picture, then it is determined from an "external key video" signal. In the case that a title is to be superimposed on the background picture, the external key video signal is typically a stream of data values which determine a sequence of antialiased character outlines. Antialiasing is a slightly soft letter shape to allow a small amount of blending around the boundary between pixels of the insert picture and pixels of the background picture. This antialias blending reduces the jagged appearance of the characters of the title in the final output image.

Processor 2, typically a microprocessor based computer circuit, implements the control system for the FIG. 1 circuit. Processor 2 generates the below-discussed parameters (or an array of look-up-table values generated using some of them) and provides these to circuits 3, 7, and 9, in response to human interface input.

Key processor 3 converts a normal video signal into a key signal. There are several commonly used control parameters for a key processor, including clip level ($c_k$), key gain ($g_k$), and key insert ($I_k$). The clip level control adjusts the threshold on the key video which produces an insert. The key gain control adjusts how quickly an increasing level of the key video will translate to pixels $\alpha$ of the key signal reaching their upper limiting value of 1.0. The key insert ($I_k$) determines the level of opacity of the insert pixels (upper limit value of $\alpha$).

As shown in FIG. 1, key processor 3 outputs a value $\alpha$ of the key signal in response to one value each of clip level $c_k$, key gain $g_k$, key insert $I_k$ (loaded from processor 2), and one pixel v of the external key video signal or insert picture signal (received from switch 1) in accordance with the equation:

$$\alpha = I_k * \mathrm{clip}(g_k*(v-c_k)).$$

In this equation, the function clip (x) has a domain determined by the values which $g_k$, v, and $c_k$ may have. The range of the function clip (x) is the interval from 0 to 1.0, inclusive. The range of key insert $I_k$ is also the interval from 0 to 1.0, inclusive. Key insert $I_k$ thus adjusts the maximum value of $\alpha$, to set the maximum blending level. By scaling the range of the key signal (the range of possible values of $\alpha$), the transparency of the key is controlled. By changing $I_k$ on a field-by-field basis, a title key can be faded in or out of the background picture.

While key processor 3 can be implemented with arithmetic circuit elements, it is usually not implemented in this manner in a digital video environment. Rather, where the video input to processor 3 (from switch 1) is a stream of digital pixels having a relatively small number of discrete values (usually 256 or 1024 possible values in common video quantization schemes), it is preferably to implement processor 3 as a look-up-table (LUT). Such an LUT implementation allows an arbitrary function of the input variables (e.g., $I_k$, $g_k$, v, and $c_K$) to be implemented. For example, the LUT can be loaded with a first array of values to implement a first function, and these values can then be overwritten by a second array of values to implement a different function.

The inventor has recognized that the above-described, conventional, two-stage implementation of a DSK operation (using a circuit having a conventional design of the type shown in FIG. 1) is inefficient and requires undesirably complicated and costly circuitry for implementation.

SUMMARY OF THE INVENTION

The invention is a method and system for implementing a DSK operation with only one mixing stage. The inventive system requires only one mixing circuit, rather than two as employed in conventional DSK systems.

In preferred embodiments of the inventive method, a DSK operation is implemented in a single mixing stage, in which an input video signal V (consisting of pixels $a_k$), an input video signal C (consisting of pixels $b_k$), and a stream of single-color (preferably black) pixels B are combined to generate a stream of output pixels having values $u_k=(1-\beta)v_k+\beta B$, where $v_k=(1-\beta)a_k+(\alpha)b_k$, $\alpha$ is a key signal which can have a different value for each input pixel $a_k$, and $\beta$ is a fade control signal. The value of $\alpha$ can be constant for an entire frame of input pixels $a_k$ or it can have a different value for each individual pixel $a_k$. Typically, the value of $\beta$ is constant for each frame of input pixels $a_k$. It is helpful to an appreciation of the efficiency of the inventive system to realize that the relation $U_k=(1-\beta)v_k+\beta B$ can equivalently be expressed as $u_k=c_g b_k+((1-\beta)-c_g)a_k+\beta B$ where $c_g=\alpha(1-\beta)$.

Preferred embodiments of the inventive system employ a single mixing circuit, which receives five input data streams: a first stream of pixels $a_k$, a second stream of pixels $b_k$, a third stream of scaled pixels $\beta B$, a first key signal $c_v=(1-\beta)-\alpha(1-\beta)$, and a second key signal $c_g=\alpha(1-\beta)$. Preferably, the inventive system includes a look-up table which outputs a "second" key signal $c_g=\alpha(1-\beta)$ in response to each input pixel $b_k$ (or in response to each pixel of an external key video signal). Also preferably, the system includes simple circuitry for processing each second key signal value $c_g$ to generate a corresponding first key signal value $c_g$. Such look-up table and simple circuitry comprise a key processing means for generating a key signal set, where the key signal set includes the first key signals and the second key signals (in the embodiments described above in this paragraph), and where the key signal set and the control values $\beta$ determine the key value $\alpha$ for each of the pixel signals $a_k$.

DETAILED DESCRIPTION OF THE PREFERRED EMBODIMENT

Figure 1:
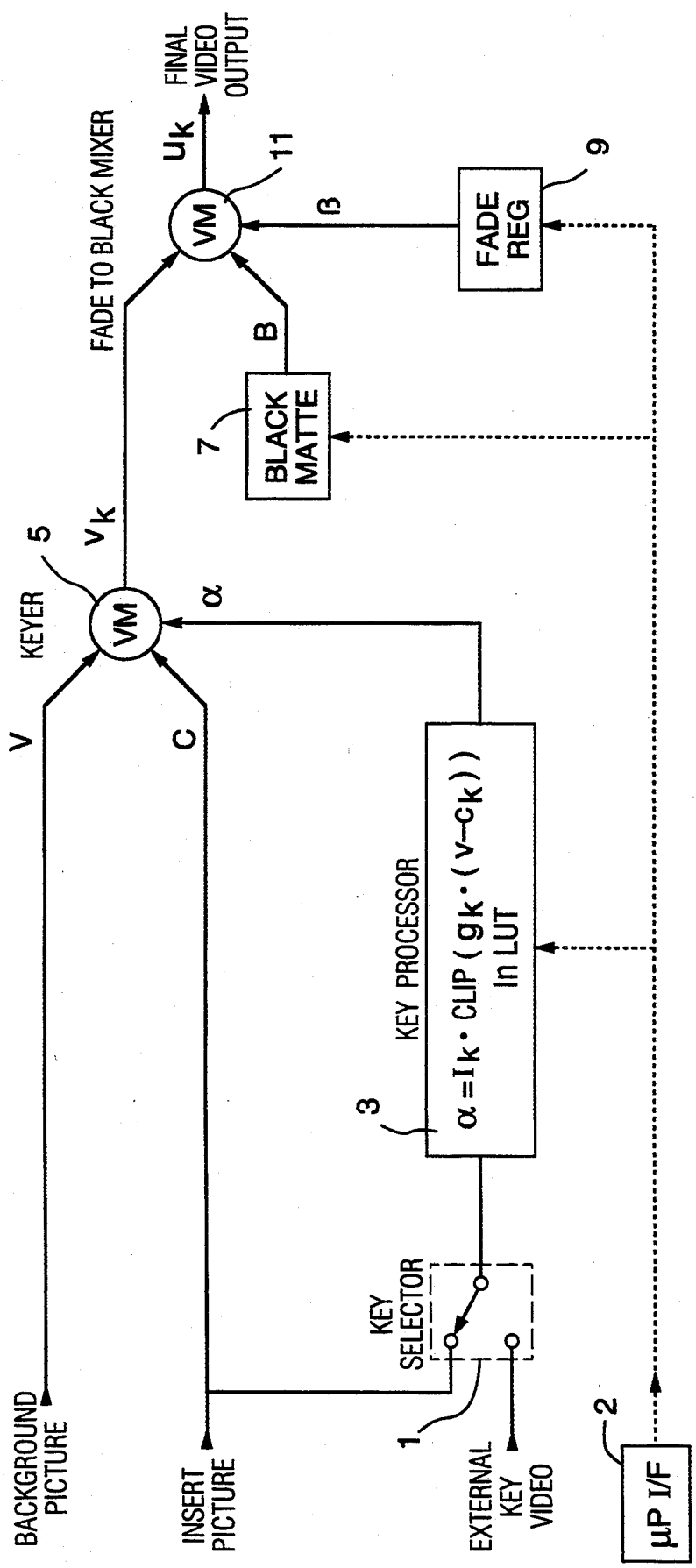
FIG. 1 is a block diagram of a conventional downstream keying (DSK) circuit, which includes separate mixing circuits for performing keying and fade to black mixing stages of the DSK operation.

The DSK operation implemented by the above-described conventional circuit of FIG. 1 combines pixels $a_k$ of a first video signal and pixels $b_k$ of a second video signal to generate output pixels having the following values:

$$u_k=(1-\beta)v_k+\beta B, \quad (1)$$

where $v_k=(1-\alpha)a_k+(\alpha)b_k$, $\alpha$ is a key signal, and $\beta$ is a fade control signal. The inventor has recognized that the conventional DSK operation represented by equation (1) can be expressed equivalently as:

$$\begin{aligned} u_k &= (c_g)b_k + (c_v)a_k + \beta B \\ &= c_g b_k + ((1-\beta) - c_g)a_k + \beta B \end{aligned} \quad (2)$$

where $c_v=(1-\beta)-\alpha(1-\beta)$, and $c_g=\alpha(1-\beta)$.

The inventor has also recognized that equation (2) has form similar to the function implemented by a single mixing circuit (i.e., mixing circuit 5 of FIG. 1). With such recognitions in mind, the inventor developed the circuit of FIG. 2, which is a preferred embodiment of the inventive system, to implement the function of equation (2).

Figure 2:
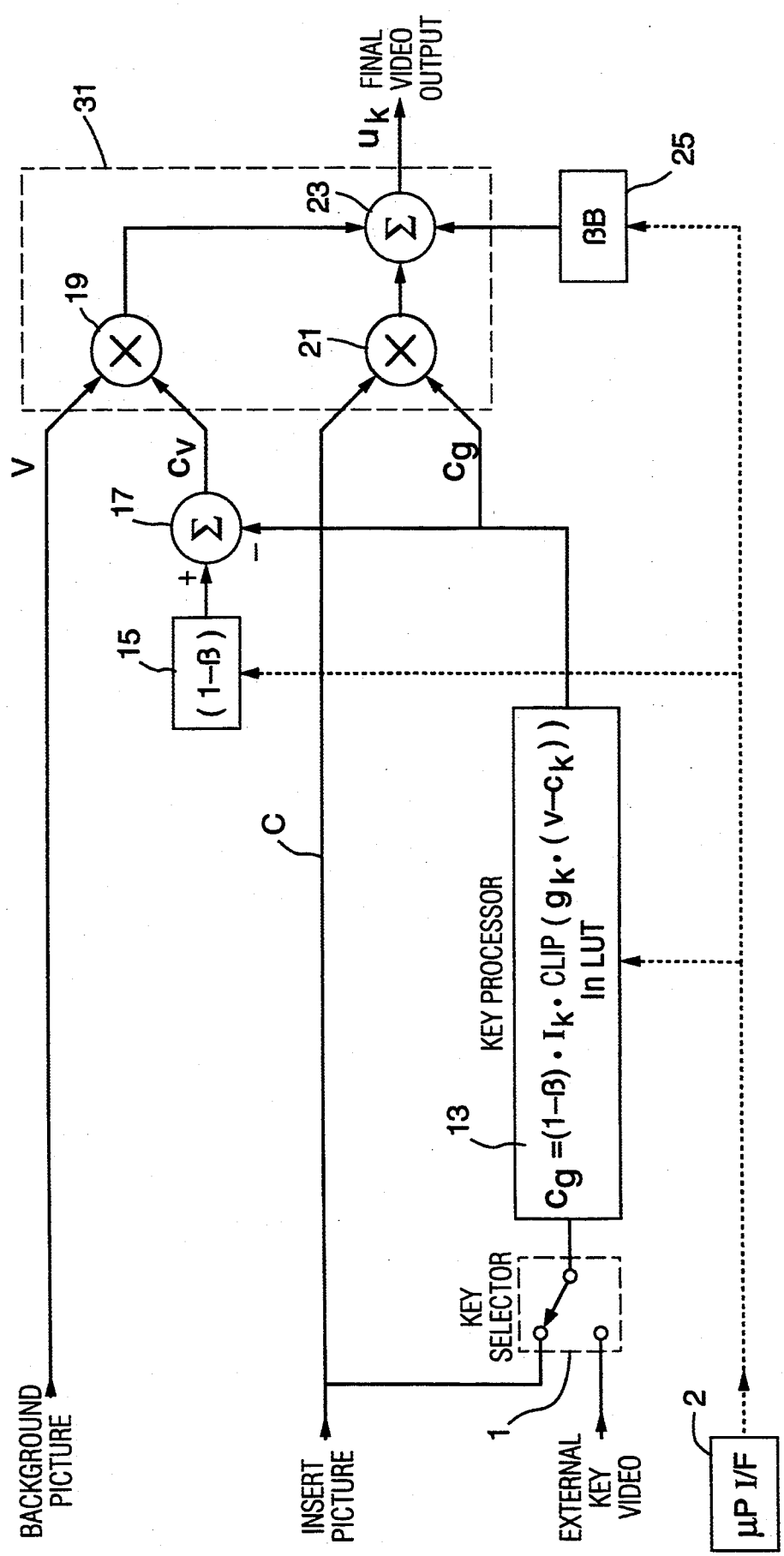
FIG. 2 is a block diagram of a preferred embodiment of the inventive system, which performs the same DSK operation as is performed by the FIG. 1 circuit, but in a new way which requires only a single mixing circuit.

The FIG. 2 circuit includes only a single mixer (the circuitry identified by reference numeral 31). Single mixer 31 receives five input data streams: a stream of pixels $a_k$ (of a first input video signal), a stream of pixels $b_k$ (of a second input video signal), a third stream of scaled pixels $\beta B$, a first key signal $c_g = \alpha(1-\beta)$, and second key signal $c_v = (1-\beta) - \alpha(1-\beta)$.

The FIG. 2 circuit is capable of performing the same DSK operation performed by the conventional circuit of FIG. 1. However, the FIG. 2 circuit can perform this operation in a more efficient, less costly manner, employing fewer circuit components.

In the FIG. 2 circuit, switch 1, processor 2, and key processor 13 can consist of the same hardware as do their counterparts (switch 1, processor 2, and key processor 3) in FIG. 1. Typically, processor 2 of FIG. 2 is programmed with slightly different software than is processor 2 of FIG. 1 (the differences in the software required in the two systems will become apparent from the following description). Key processor 13 of FIG. 2 is preferably an LUT which consists of hardware identical to the LUT hardware of key processor 3 of FIG. 1. However, processor 13 is loaded with an array of key values $c_g$, which are different from the values $\alpha$ loaded into processor 3 of FIG. 1. Key values $c_g$ of FIG. 2 represent a different function of the same input variables (e.g., $I_k$, $g_k$, $v$, and $c_k$) than do key values $\alpha$ of FIG. 1.

Key processor 13 of FIG. 2 outputs one key signal value (value $c_g$, rather than value $\alpha$ as in FIG. 1) in response to one value each of clip level $c_k$, key gain $g_k$, key insert $I_k$, and value $\beta$ (loaded from processor 2), and one pixel $v$ of the external key video signal or insert picture signal (received from switch 1). However, it does so in accordance with the following function (which differs slightly from that implemented by key processor 3 of FIG. 1):

$$c_g = (1-\beta)I_k^* \text{clip}(g_k^*, (v-c_k)) \qquad (3)$$

In equation (3), the function clip (x) is identical to the function clip (x) described above with reference to key processor 3 of FIG. 1. Equation (3) differs from the function implemented by key processor 3 of FIG. 1 only by including the additional factor "$(1-\beta)$".

With reference to FIG. 2, key processor 13 outputs one key signal value $c_g(=\alpha(1-\beta))$ for each pixel $v$ of the external key video (or insert picture) signal it receives from switch 1. Under control of processor 2, key processor 13 transfers each value $c_g$ at an appropriate time both to a first input terminal of subtraction circuit 17 and to one input terminal of multiplication circuit 21 of circuit 31.

Processor 2 also controls the writing of values $(1-\beta)$ into register 15, and the transfer of values $(1-\beta)$ from register 15 to a second input terminal of subtraction circuit 17. Circuit 17 subtracts each "first" key signal value $c_g$ from $(1-\beta)$ to generate a "second" key signal $c_v = (1-\beta) - \alpha(1-\beta)$.

The stream of "second" key signals $c_v$ asserted sequentially at the output of circuit 17 is received at one input terminal of multiplier 19 within circuit 31. The other input terminal of multiplier 19 receives stream of pixels $a_k$ (of first input video signal V). The output of multiplier 19, a sequence of values $(c_v)(a_k)$, is supplied to one input terminal of addition circuit 23 within circuit 31.

The same stream of pixels $b_k$ of second input video signal C (denoted as the "insert picture" in FIG. 2) is received at key selector switch 1 and at one input terminal of multiplication circuit 21 of circuit 31. The other input terminal of multiplication circuit 21 receives the stream of "first" key signals $c_g$ asserted sequentially at the output of processor 3. The output of multiplier 21, a sequence of values $(c_g)(b_k)$, is supplied to a second input terminal of addition circuit 23.

Processor 2 controls the transfer of scaled pixels $\beta B$ from register 25 to a third input terminal of addition circuit 23. As in the FIG. 1 circuit, each of value B and value $\beta$ (and thus the value of the product $\beta B$) remains constant for each frame of input pixels $a_k$. The stream of scaled pixels $\beta B$ is thus a fade control signal, to be mixed with the outputs of circuits 19 and 21 to accomplish a "fade to single color" mixing operation. Typically, each value B is a black video value (rather than a value representing some other color), so that the "fade to single color" mixing operation is a "fade to black" mixing operation.

Circuit 23 asserts at its output a stream of output pixels $$\begin{aligned} u_k &= (c_g)b_k + (c_v)a_k + \beta B \\ &= c_g b_k + ((1-\beta) - c_g)a_k + \beta B, \end{aligned}$$

which are the output pixels described above with reference to equation (2).

In typical operation of the FIG. 2 circuit, each of $\beta$ and B has a constant value during processing of each frame of input pixels $a_k$, and the output of circuit 31 is a video signal which, when displayed, will fade to a black (or other solid color) image determined by pixels B, from a sequence of images determined by pixels $a_k$ of the first video signal (with titles determined by pixels $b_k$ of the second video signal superimposed on such images).

In typical operation of FIG. 2 (as in FIG. 1), the first video signal (denoted "background picture" in FIG. 2) consists of frames of pixel data, each frame determining a picture on which the key is to be superimposed. The second video signal (denoted "insert picture" in FIG. 2) consists of pixels determining the fill pattern of the key. In typical embodiments, the input video signals are color video signals whose color components (e.g., red, green, and blue components, or luminance and chrominance components) are multiplexed according to the well known CCIR 601 standard (or the well known SMPTE/EBU recommended practice known as RP125). In preferred embodiments in which the input video signals are color video signals satisfying the CCIR 601 multiplexing scheme, all color components of each video signal are processed in a single channel of high speed DSP hardware.

In the FIG. 2 embodiment as well as in FIG. 1, the insert picture sometimes consists of frames of pixel data. If each of such frames were displayed, it would appear as a title surrounded by a field of black pixels. The first key signal (the values $c_g$) can readily be determined from such an insert picture. If the key ($c_g$) is not determined from the insert picture, then it is determined from an external key video signal. In the case that a title is to be superimposed on the back ground picture, the external key video signal is typically a stream of data values which determine a sequence of antialiased character outlines.

In FIG. 2 as in FIG. 1, processor 2 (which implements the control system for the FIG. 2 circuit) is typically a microprocessor based computer circuit. Processor 2 generates the parameters $c_k$ (clip level), $g_k$ (key gain), $I_k$ (key insert), $\beta$, and B, and provides them (or an array of look-up-table values generated using some of them) to circuits 13, 15, and 25, in response to human interface input. In preferred embodiments of FIG. 2, processor 2 loads an array of look-up-table values (generated using the four parameters $c_g$, $g_k$, $I_k$, and $\beta$) to key processor 13, and provides parameters $\beta B$ to register 25. In contrast, in preferred embodiments of FIG. 1, processor 2 loads an array of look-up-table values (generated using only the parameters $c_k$, $g_k$, and $I_k$) to key processor 3, and provides parameters $\beta$ to register 7 and parameters B to register 9.

Mixing circuit 31 of FIG. 2 performs two multiplication operations and one addition operation. In contrast, mixing circuits 5 and 11 of FIG. 1 together perform four multiplication operations and four addition operations.

Mixing circuit 31 is a common digital function, and can be implemented in a straightforward manner. An example of a commercially available circuit which can perform the function of mixing circuit 31 is an IVEX PWA-01 circuit.

In preferred embodiments, key processor 13 of FIG. 2 is a look-up table into which processor 2 has loaded an array of values $c_g$. Alternatively, key processor 13 can be implemented with circuitry for performing the desired conversion of each input pixel v (from switch 1) to an output value $c_g$.

Various other modifications and alterations in the method and system of the invention will be apparent to those skilled in the art. Although the invention has been described in connection with specific preferred embodiments, it should be understood that the invention as claimed should not be unduly limited to such specific embodiments.

What is claimed is:

1. A system for combining a first stream of video pixel signals $a_k$ with a second stream of video pixel signals $b_k$ and mixing a combination of the pixel signals $a_k$ and the pixel signals $b_k$ in accordance with a stream of control values $\beta$ and a single-color value B, said system including:

key processing means for generating a key signal set, wherein the key signal set includes at least one key signal, and wherein the key signal set and the control values $\beta$ determines a key value $\alpha$ for each of the pixel signals $a_k$; and a mixing circuit connected to the key processing means, for receiving the pixel signals $a_k$, the pixel signals $b_k$, the key signal set, and a stream of fade control values $\beta B$, and generating therefrom a stream of output pixels, where each of the output pixels has a value $u_k=(1-\beta)v_k+\beta B$, where $v_k=(1-\alpha)a_k+(\alpha)b_k$.

2. The system of claim 1, wherein the fade control values $\beta B$ for each frame of the pixel signals $a_k$ are all substantially equal to each other.

3. The system of claim 1, wherein the key signal set determines a key value $\alpha$ for each of the pixel signals $a_k$.

4. The system of claim 1, wherein the key signal set consists of a first key signal having values $c_g=\alpha(1-\beta)$, and second key signal having values $c_v=(1-\beta)-\alpha(1-\beta)$.

5. The system of claim 4, wherein the mixing circuit includes:

a first multiplication means for generating a first product signal by multiplying one of the pixel signals $a_k$ by a corresponding one of the values $c_v$;

a second multiplication means for generating a second product signal by multiplying one of the pixel signals $b_k$ by a corresponding one of the values $c_g$; and an addition means for summing each value of the first product signal, with a corresponding value of the second product signal and a corresponding one of the fade control values $\beta B$, thereby generating one of the output pixels.

6. The system of claim 4, wherein the key processing means includes a look-up table which outputs one of the values $c_g$ for each of the pixel signals $a_k$.

7. The system of claim 6, also including:

a key selector switch means for providing a selected signal having values v to the look-up table, wherein the selected signal is a selected one of the second stream of video pixel signals $b_k$ and an external key video signal.

8. The system of claim 7, wherein the values v are the pixel signals $b_k$, and wherein the look-up table outputs each said one of the values $c_g$ in response to one of the pixel signals $b_k$.

9. The system of claim 7, wherein each of the values $c_g$ is a function of one of the values v, one of the control values $\beta$, a clip level, a key gain value, and a key insert value.

10. A system for performing keyed combination of a first stream of video pixel signals $a_k$ with a second stream of video pixel signals $b_k$ and fading to solid color mixing of a combination of the pixel signals $a_k$ and the pixel signals $b_k$ in accordance with a stream of control values $\beta$ and a single-color value B, said system including:

key processing means for generating a first key signal having values $c_g=\alpha(1-\beta)$, where each of values $\alpha$ is a key value for one of the pixel signals $a_k$;

means for generating a second key signal having values $c_v=(1-\beta)-\alpha(1-\beta)$ from the first key signal;

a mixing circuit connected to the key processing means and the means for generating the second key signal, for receiving the pixel signals $a_k$, the pixel signals $b_k$, the first key signal, the second key signal, and a stream of fade control values $\beta B$, and generating therefrom a stream of output pixels, where each of the output pixels has a value $U_k=(1-\beta)v_k+\beta B$, where $v_k=(1-\alpha)a_k+(\alpha)b_k$.

11. The system of claim 10, wherein the fade control values $\beta B$ for each frame of the pixel signals $a_k$ are all substantially equal to each other.

12. The system of claim 10, wherein the key processing means includes a look-up table which outputs one of the values $c_g$ for each of the pixel signals $a_k$.

13. The system of claim 12, also including:

a key selector switch means for providing a selected signal having values v to the look-up table, wherein the selected signal is a selected one of the second stream of video pixel signals $b_k$ and an external key video signal.

14. The system of claim 13, wherein each of the values $c_g$ is a function of one of the values v, one of the control values $\beta$, a clip level, a key gain value, and a key insert value.

15. The system of claim 10, wherein the mixing circuit includes:

a first multiplication means for generating a first product signal by multiplying one of the pixel signals $a_k$ by a corresponding one of the values $c_v$;

a second multiplication means for generating a second product signal by multiplying one of the pixel signals $b_k$ by a corresponding one of the values $c_g$; and an addition means for summing each value of the first product signal, with a corresponding value of the second product signal and a corresponding one of the fade control values $\beta B$, thereby generating one of the output pixels.

16. A method for combining a first stream of video pixel signals $a_k$ with a second stream of video pixel signals $b_k$ and mixing a combination of the pixel signals $a_k$ and the pixel signals $b_k$ in accordance with a stream of control values $\beta$ and a single-color value B, including the steps of:

(a) generating a key signal set, wherein the key signal set includes at least one key signal, and wherein the key signal set and the control values $\beta$ determines a key value $\alpha$ for each of the pixel signals $a_k$; and (b) in a single mixing circuit, processing the pixel signals $a_k$, the pixel signals $b_k$, the key signal set, and a stream of fade control values $\beta B$, to generate a stream of output pixels, where each of the output pixels has a value $u_k=(1-\beta)v_k+\beta B$, where $v_k=(1-\alpha)a_k+(\alpha)b_k$.

17. The method of claim 16, wherein the fade control values $\beta B$ for each frame of the pixel signals $a_k$ are all substantially equal to each other.

18. The method of claim 16, wherein the key signal set determines a key value $\alpha$ for each of the pixel signals $a_k$.

19. The method of claim 16, wherein the key signal set consists of a first key signal having values $c_g=\alpha(1-\beta)$, and second key signal having values $c_v=(1-\beta)-\alpha(1-1\beta)$.

20. The method of claim 19, wherein step (b) includes the steps of:

generating a first product signal by multiplying one of the pixel signals $a_k$ by a corresponding one of the values $c_v$;

generating a second product signal by multiplying one of the pixel signals $b_k$ by a corresponding one of the values $c_g$; and summing each value of the first product signal, with a corresponding value of the second product signal and a corresponding one of the fade control values $\beta B$, thereby generating one of the output pixels.

21. The method of claim 19, wherein step (a) includes the steps of:

(c) loading an array of the values $c_g$ into a look-up table; and (d) outputting one of the values $c_g$ from the look-up table for each of the pixel signals $a_k$.

22. The method of claim 21, further including the step of:

providing a selected signal having values v to the look-up table, wherein the selected signal is a selected one of the second stream of video pixel signals $b_k$ and an external key video signal.

23. The method of claim 22, wherein the values v are the pixel signals $b_k$, and wherein step (d) includes the step of outputting said one of the values $c_g$ in response to one of the pixel signals $b_k$.

24. A method for performing keyed combination of a first stream of video pixel signals $a_k$ with a second stream of video pixel signals $b_k$ and fading to solid color mixing of a combination of the pixel signals $a_k$ and the pixel signals $b_k$ in accordance with a stream of control values $\beta$ and a single-color value $\beta$, said method including the steps of:

(a) generating a first key signal having values $c_g=\alpha(1-\beta)$, where each of values $\alpha$ is a key value for one of the pixel signals $a_k$;

(b) generating a second key signal having values $c_v=(1-\beta)-\alpha(1-\beta)$ from the first key signal;

(c) in a single mixing circuit, generating a stream of output pixels from the pixel signals $a_k$, the pixel signals $b_k$, the first key signal, the second key signal, and a stream of fade control values $\beta B$, where each of the output pixels has a value $u_k=(1-\beta)v_k+\beta B$, where $v_k=(1-\alpha)a_k+(\alpha)b_k$.

25. The method of claim 24, wherein the fade control values $\beta B$ for each frame of the pixel signals $a_k$ are all substantially equal to each other.

26. The method of claim 24, wherein step (c) includes the steps of:

generating a first product signal by multiplying one of the pixel signals $a_k$ by a corresponding one of the values $c_v$;

generating a second product signal by multiplying one of the pixel signals $b_k$ by a corresponding one of the values $c_g$; and summing each value of the first product signal, with a corresponding value of the second product signal and a corresponding one of the fade control values $\beta B$, thereby generating one of the output pixels.

27. The method of claim 24, wherein step (a) includes the steps of:

loading an array of the values $c_g$ into a look-up table; and outputting one of the values $c_g$ from the look-up table for each of the pixel signals $a_k$.

28. The method of claim 24, wherein step (b) includes the steps of:

providing a stream of values $(1-\beta)$ to a subtraction means; and in the subtraction means, subtracting each of the values $c_g$ from a corresponding one of the values $(1-\beta)$, thereby generating the second key signal.

* * * * *